(12) United States Patent  (10) Patent No.: US 6,649,828 B2
Rockney et al.  (45) Date of Patent: Nov. 18, 2003

(54) SELF-SEALING REFLECTIVE SLEEVE

(75) Inventors: Douglas Rockney, Naperville, IL (US); Clifford Selby, Mount Pleasant, SC (US); William M Gregg, Moncks Corner, SC (US)

(73) Assignee: Custom Coated Components, Inc, Summerville, SC (US)

( * ) Notice: Subject to any disclaimer, the term of this patent is extended or adjusted under 35 U.S.C. 154(b) by 0 days.

(21) Appl. No.: 09/841,143

(22) Filed: Apr. 24, 2001

(65) Prior Publication Data

US 2002/0074152 A1 Jun. 20, 2002

(Under 37 CFR 1.47)

Related U.S. Application Data

(60) Provisional application No. 60/201,087, filed on May 2, 2000.

(51) Int. Cl.[7] .............................. H01B 7/34; H01B 7/18
(52) U.S. Cl. ........................................... 174/36; 174/107
(58) Field of Search ..................... 174/36, 105 R, 174/107, 108, 115, 102 R, 103, 104, 117 FF, 109; 428/189, 343

(56) References Cited

U.S. PATENT DOCUMENTS

| 3,624,267 A | * | 11/1971 | Plummer | 174/6 |
| 3,770,556 A | * | 11/1973 | Evans et al. | 428/77 |
| 3,913,623 A |   | 10/1975 | Siegwart | |
| 4,327,246 A | * | 4/1982 | Kincaid | 174/36 |
| 4,396,039 A |   | 8/1983 | Klenk et al. | |
| 4,399,840 A | * | 8/1983 | Lee | 138/168 |
| 4,406,914 A | * | 9/1983 | Kincaid | 174/107 |
| 4,448,824 A | * | 5/1984 | Holmes et al. | 428/33 |
| 4,453,031 A | * | 6/1984 | Justiss | 174/36 |
| 4,500,578 A | * | 2/1985 | van de Kamp | 428/36.1 |
| 4,533,784 A | * | 8/1985 | Olyphant, Jr. | 174/36 |
| 4,737,210 A | * | 4/1988 | Dougherty | 156/148 |
| 4,778,703 A |   | 10/1988 | Fontanilla | |
| 4,802,509 A | * | 2/1989 | Brandolf | 138/110 |
| 4,803,104 A | * | 2/1989 | Peigneur et al. | 428/35.1 |
| 4,855,534 A | * | 8/1989 | O'Connor | 174/36 |
| 4,867,269 A | * | 9/1989 | Lalikos et al. | 181/207 |
| 4,930,543 A | * | 6/1990 | Zuiches | 138/110 |
| 4,937,111 A |   | 6/1990 | Fontanilla | |
| 5,053,582 A | * | 10/1991 | Terakawa et al. | 174/36 |
| 5,178,923 A | * | 1/1993 | Andrieu et al. | 428/36.1 |
| 5,329,064 A | * | 7/1994 | Tash et al. | 174/36 |
| 5,366,771 A | * | 11/1994 | Beersel et al. | 428/34.9 |
| 5,428,187 A | * | 6/1995 | Crane et al. | 174/36 |
| 5,613,522 A | * | 3/1997 | Ford et al. | 138/123 |
| 5,660,899 A | * | 8/1997 | Rockney et al. | 428/34.7 |
| 5,939,668 A | * | 8/1999 | De Win | 174/36 |
| 6,310,284 B1 | * | 10/2001 | Ikeda | 174/35 R |

\* cited by examiner

*Primary Examiner*—William H. Mayo, III
(74) *Attorney, Agent, or Firm*—Michael A. Mann; Wm. Y. Klett, III; Nexen Pruet Jacobs Pollard, LLC

(57) ABSTRACT

A self-sealing sleeve (10) is provided having an inner layer (12) and an outer layer (14). The inner layer is composed of a thermally inert material and is configured to have a self-sealing overlap (16). The outer layer (14) is made of a heat reflective, insulating material and is disposed along the periphery of the inner layer (12) thereby providing heat insulation and protection from corrosives to wires, conduits and like disposed in the lumen (20) of the sleeve (10).

17 Claims, 2 Drawing Sheets

SELF-SEALING REFLECTIVE SLEEVE

PRIORITY CLAIM

The Applicants claim the benefit of the filing date of U.S. Provisional patent application serial No. 60/201,087 filed May 2, 2000, which is incorporated herein by reference.

FIELD OF THE INVENTION

The present invention relates generally to protective sleeves for electrical wiring and hoses. In particular, the present invention is a self-sealing reflective sleeve that provides protection for wiring and hoses from excessive heat.

BACKGROUND OF THE INVENTION

In, for example, an automobile engine compartment, there are various hoses and electrical wires that pass near the engine or near other heat generating components where they are exposed to heat during the operation of the vehicle. Heat has an adverse effect on the insulation on electrical wiring and tends to degrade it and can also interfere with operation long before the insulation fails. Likewise, automotive fluids and fluid handling conduits are quickly degraded and pose a safety risk if directly exposed to the high temperatures of components carrying engine exhaust.

The need for thermally insulated electrical wiring and hoses is not confined to the automobile industry. There are, in fact, many applications where electrical wiring and hoses traverse a thermally elevated environment where thermal insulation would assure longer, more reliable operation. Moreover, there are many environments where insulation from extreme cold would also insure longer, more reliable operation.

There are many types of sleeves that shield wiring and hoses from the effects of heat. Typically, these are composed of a series of layers including at least one that reflects heat. Because of the need for flexibility, either flexible material or structural features that permit flexing are incorporated into the design of these sleeves. A problem with these sleeves is in installation. Clearly, whenever possible, a sleeve should be slipped over the end of the wiring or tubing it is designed to protect and be moved axially into position. However, it is often more convenient to be able to wrap the sleeve over the wiring and cabling from the side. If the sleeve is slit lengthwise to accommodate installation from the side, the slit itself becomes a route through which heat can penetrate, especially when the sleeve is bent because of the formation of gaps along the slit.

There remains a need for a thermally insulating sleeve that has good flexibility in both the unflexed and flexed conditions.

SUMMARY OF THE INVENTION

According to its major aspects and briefly recited, the present invention is a self-sealing reflective sleeve for use in insulating electrical wiring, hoses and tubing from heat or cold and that includes an inner layer and an outer layer. The inner layer is comprised of a tube that, depending on the temperature of application, can made of nylon, polyethylene, polypropylene or any other suitable plastic. The outer layer, depending on the temperature of the application and the desired insulating properties, can be made of, for example, lightweight fiberglass fabric laminated to aluminum foil. The aluminum foil reflects heat while the fiberglass fabric resists thermal change thereby isolating the aluminum foil which acts as a heat sink. Different outer layers can be used where climactic conditions so dictate. For example, the fabric and foil can be varied in both thickness and material to adapt to the end-use conditions such as, heat, cold, flexing requirements, and the like. In alternate embodiments, metalized polyester films may be used as the outer covering material.

The self-sealing reflective sleeve of the present invention affords enhanced thermal protection as compared to conventional sleeves currently available. When using, for example, a self-sealing reflective sleeve according to the present invention made of fiberglass fabric and aluminum foil, the aluminum foil imparts high heat reflectivity while the fiberglass fabric provides an insulating factor under the aluminum foil thereby providing enhanced thermal protection for the hoses or electrical wiring inside.

Another benefit of the present invention, is that the self-sealing reflective sleeve enjoys excellent flexibility without gapping, and, therefore, does not hinder the flexibility of hoses, tubing and wiring to which it is applied.

Yet another benefit of the present invention is that it lacks the common problem in conventional sleeves of having a slit, namely, gapping. Even under extreme flexing, the seam of the self-sealing reflective sleeve of the present invention remains closed.

Yet another benefit of the self-sealing reflective sleeve of the present invention as compared to conventional sleeves is the maintenance of a continuous closure.

Yet another advantage of the self-sealing reflective sleeve of the preset invention is that it provides enhanced heat protection due to the presence of air pockets between the two layers.

Still another feature of the present invention is that the self-sealing reflective sleeve of the present invention is constructed by wrapping of the outer layer laminate over the longitudinal edges of the inner layer thereby providing a smooth edge rather than the saw-tooth edge of conventional convoluted sleeves. This feature is especially significant when the end-use application is on wire harnesses where there is great concern regarding insulation cut-through at the time of installation.

Other features and their advantages will be apparent to those skilled in automotive electronics or fluid handling from a careful reading of the Detailed Description of Preferred Embodiments, accompanied by the following drawings.

DETAILED DESCRIPTION OF PREFERRED EMBODIMENTS

The present invention is a self-sealing reflective sleeve made of an inner layer and an outer layer. The inner layer comprising corrugated plastic tubing. The outer layer comprising a fiberglass fabric laminated to aluminum foil, a metalized polyester film, or the like.

Figure 1:
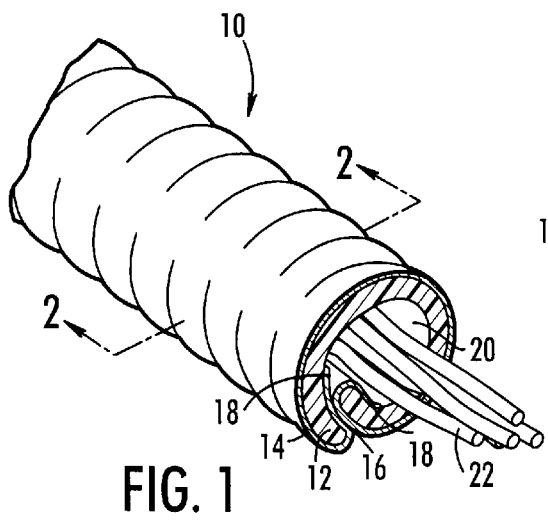
FIG. 1 is a perspective view of an end of a self-sealing reflecting sleeve, according to a preferred embodiment of the present invention.

With reference to FIG. 1, a self-sealing reflective sleeve according to one preferred embodiment of the present invention is identified by the numeral 10. FIG. 1 illustrates a single end of the self-sealing reflective sleeve wrapped around, protecting and insulating the enclosed wires, tubing or hoses. Self-sealing reflective sleeve 10 is comprised of an inner layer 12 and an outer layer 14. Inner layer 12 is polymeric tubing which may or may not be corrugated. The tubing is preferably made of nylon, such as nylon 6, but may be made of any inert, thermally neutral material. The thermally inert material is preferably made of a polymeric material possessing adequate heat resistance so that it does not deform, flow or melt or otherwise lose its physical, structural integrity during long-term exposure to, for example in the case of engine use, underhood heat conditions—the environment of use—, while it maintains resistance to cracking or excessive brittleness during typical low-temperature environmental conditions. Suitable thermally neutral materials useful in the practice of the invention include nylons, polyamides, certain polyolefins, and the like. More specifically, nylon 6, nylon 6.6, polyethylene and polypropylene are the preferred thermally neutral materials.

The inner layer 12 is generally commercially available in suitable sizes and thicknesses and may be in corrugated form as shown or in non-corrugated form (not illustrated). The outer diameter of inner layer 12 will generally range from between about 0.375 inches (about 9.5 mm) and about 2 inches (100 mm). Wall thickness of inner layer 12 should vary in accordance with outer diameter so as to insure proper flexibility of the overall self sealing reflective sleeve 10 and should generally range proportionally from about 0.01 inches (about 0.25 mm) to about 0.03 inches (about 0.76 mm). It is understood that the foregoing ranges are those to be used in applications such as automobile and truck engines, however, in other applications, the exemplary values provided could be varied to insure that a self-sealing reflective sleeve in accordance with the present invention may prove satisfactory in the environment of use.

The inner layer 12 is configured to have an overlap 16 which provides inner layer 12 with the ability to self-seal as well as rapid in situ installation and removal. The overlap 16, as measured along the outer circumferential surface, will generally range in length from about 0.125 inches (3 mm) to about 0.5 inches (12.7 mm), but also be in proportional to the overall diameter of inner layer 12.

Outer layer 14 is preferably comprised of a lightweight fiberglass fabric laminated to aluminum foil. Alternative useful materials to use to laminate fiberglass fabric include other low-emissivity metallic foils, metalized polyester films and the like. To provide significant heat rejection, the foils or films generally have radiant emissivities below a value of 0.05. In the case of a fiberglass fabric laminated to aluminum foil, foil thickness generally ranges from between about 0.0005 inches (about 0.013 mm) and about 0.002 inches (about 0.05 mm), more typically from between about 0.0006 inches (about 0.015 mm) and about 0.001 inches (about 0.025 mm). The foil provides self-sealing reflective sleeve 10 suitable thermal reflectivity while the fiberglass fabric provides suitable insulation. The fiberglass fabric should be lightweight, strong and tough and not restrict the flexibility of inner layer 12. Typical fiberglass fabric layer thickness will range from about 0.001 inches (about 0.025 mm) and about 0.025 inches (about 0.64 mm), most typically about 0.0015 inches (about 0.04 mm). Thus configured, self-sealing reflective sleeve 10 provides an internal lumen 20 through which may be disposed, for example. wires 22 which will be protected and insulated from ambient extremes of heat as well as from corrosives and the like.

These ranges of thicknesses and diameters are in proportion but would be different for different scales of sleeves. The ratio of thickness of inner layer 12 to its diameter and of overlap to diameter would, however, be generally the same regardless of scale.

Figure 2:
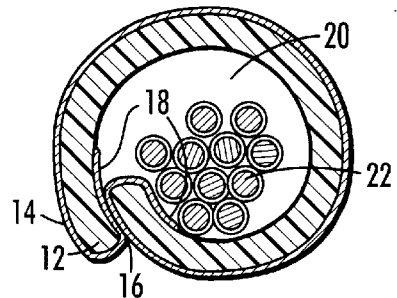
FIG. 2 is a cross section of the self-sealing reflective sleeve depicted in FIG. 1.

Referring now to FIG. 2, outer layer 14 is disposed along the outer circumferential surface of inner layer 12 and covers both the outer circumferential surface of that layer as well as overlap 16 and along a portion of the inner circumferential surface of inner layer 12 extending past overlap 16 in lumen 20 where it is anchored at anchoring point 18. Suitable anchoring means include, for example, adhesives. Suitable adhesives for use in the present invention include, for example, pressure-sensitive adhesives, cyanoacrylates, and thermoset adhesives. Other adhesives may also be used. A pressure sensitive adhesive would typically be acrylic based to withstand high temperatures. Hot melt adhesives would be polyamide based. Also, the fabric-foil can be fused to the inside of the corrugated tubing by using a heating element inside the corrugated tubing and applying a very high heat through the fabric-foil to melt the nylon corrugation locally and fuse it to the fabric-foil. Only the interior "crowns" of the corrugated tubing would be melted on the inside so as not to totally degrade the material. No adhesive would be used. To aid in wrapping the outer layer 14 during manufacture, additional isolated amounts of adhesive may be used on the exterior of inner layer 12. The minimal adhesive and aluminized fiberglass cover are only adhered to the exterior "crowns" of inner layer 12 so that the beneficial air pockets are created and flexibility is maintained.

Figure 3:
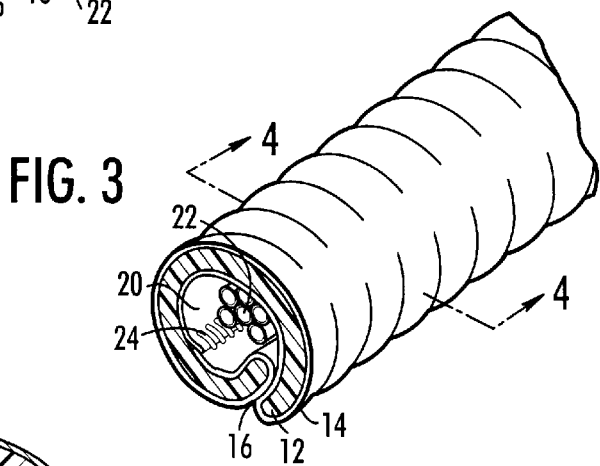
FIG. 3 is perspective view of an end of a self-sealing reflective sleeve, according to a different preferred embodiment of the present invention.
Figure 4:
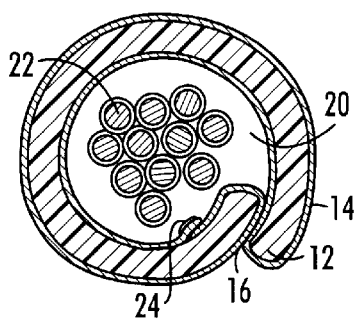
FIG. 4 is a cross section of the self-sealing reflective sleeve depicted in FIG. 3.
Figure 5:
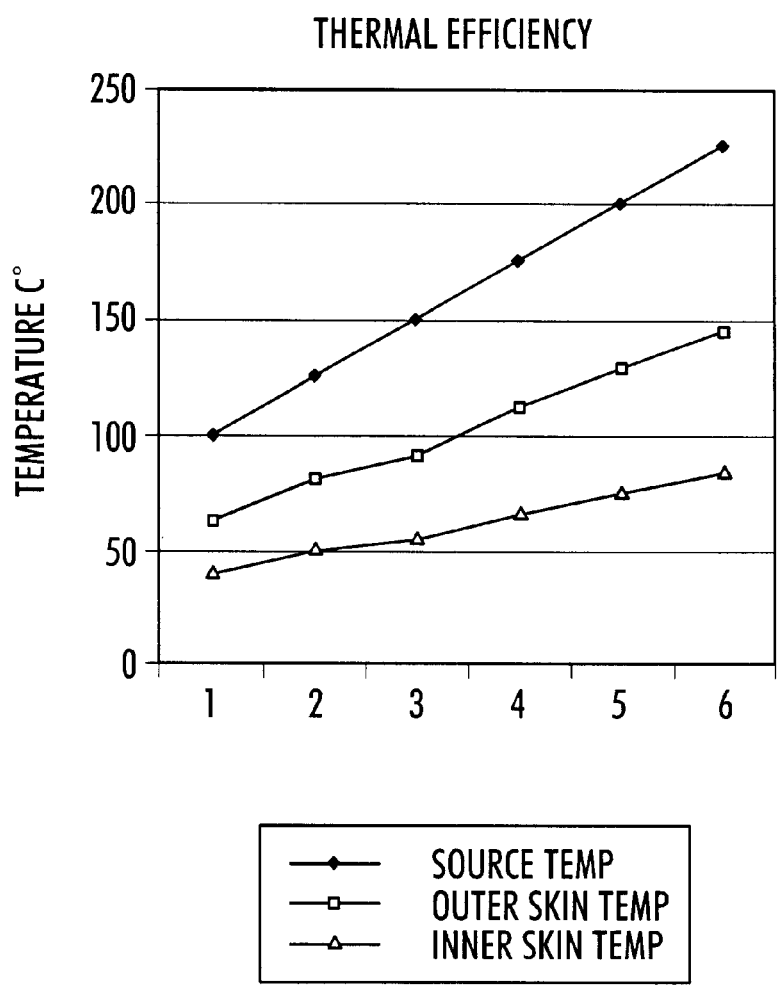
FIG. 5 is a graph illustrating thermal efficiency as a function of temperature.

FIG. 3 depicts an alternative embodiment of the present invention in which outer layer 14 extends along both the outer and inner periphery of inner layer 12 and is anchored by anchoring means 24. In FIG. 4, depicts preferred anchoring means 24 as stitching. Alternate means for the anchoring of the ends of outer layer 14 to each other include previously disclosed adhesives, fusing, and additionally sonic welding. This preferred embodiment provides enhanced protection to, for example, wires 22 disposed in lumen 20 by providing, in essence, a second layer of shielding.

The following example is illustrative of the invention and is not intended to limit the scope of the invention as described above and claimed hereafter.

EXAMPLE 1

The self-sealing reflective sleeve described above has utility in automotive underhood air conditioning, coolant, brake, fuel and hydraulic line, and wire harness applications. The fabric was subjected to environmental temperatures ranging from −40° F. to 500° F. (−40° C. to 260° C.). The following performance characteristics were observed.

| WEIGHT | |
| --- | --- |
| Method: ASTM D 3776 | 5.28 OZ/SQ. YD |
| THICKNESS | |
| Method: ASTM D 1777 | 0.0058 |
| TENSILE STRENGTH | |
| Method: ASTM C 1136 | |
| Warp: | 90 lbs/in width |
| Fill: | 70 lbs/in width |
| TEAR STRENGTH | |
| Method: ASTM D 2261 | |
| Warp: | 5.0 lbs |
| Fill: | 6.6 lbs |
| MULLEN BURST | |
| Method: ASTM D 774 | 190 PSI |
| FLAME RESISTANCE | |
| Method: TRWES-01043A | Does not support combustion |
| EMISSIVITY (Foil Side) | 0.03 |
| Method: ASTM C 408 | |

It will be apparent that many changes and substitutions can be made to the foregoing preferred embodiments without departing from the spirit and scope of the invention, defined by the appended claims.

What is claimed is:

1. A self-sealing reflective sleeve, comprising:

an inner tubular layer having a longitudinal slit, said longitudinal slit defining two longitudinal edges overlapping each other, said inner tubular layer having an inner circumferential surface and an outer circumferential surface;

an outer layer covering said outer circumferential surface, said two longitudinal edges, and at least a portion of said inner circumferential surface of said inner layer; and means for attaching said outer layer to the inner circumferential surface of said inner tubular layer so that said outer layer is secured to said inner tubular layer and smoothes said longitudinal edges, said two longitudinal edges overlapping to seal said self-sealing reflective sleeve without attachment of said overlapping longitudinal edges so that said reflective sleeve can be installed and removed in situ.

2. The self-sealing reflective sleeve in accordance with claim 1, wherein said inner layer is comprised of a thermally inert, flexible material selected from the group consisting of nylon, polypropylene, polyethylene, polyamides, and polyolefin.

3. The self-sealing reflective sleeve in accordance with claim 1, wherein said inner layer is corrugated.

4. The self-sealing reflective sleeve in accordance with claim 1, wherein said inner layer is tubular and has a thickness to diameter ratio given by a thickness in the range of 0.01 inches to 0.03 inches and an inside diameter in the range of 0.375 inches to 2.0 inches.

5. The self-sealing reflective sleeve in accordance with claim 1, wherein said inner layer is tubular and has an overlap to diameter ratio given by an overlap in the range of 0.125 inches to 0.5 inches and a diameter in the range of 0.375 inches to 2 inches.

6. The self-sealing reflective sleeve in accordance with claim 1, wherein said outer layer is comprised of a material selected from the group consisting of fiberglass fabric laminated to aluminum foil and metalized polyester film.

7. The self-sealing reflective sleeve in accordance with claim 1, wherein said attaching means is selected from the group consisting of a pressure-sensitive adhesives, cyanoacrylates, and thermoset adhesives.

8. The self-sealing reflective sleeve in accordance with claim 1, wherein said attaching means attaches by fusing said outer layer to a locally melted surface of the inside circumferential surface of said inner layer.

9. A self-sealing reflective sleeve, comprising: an inner tubular layer having a longitudinal slit defining two longitudinal edges, said two longitudinal edges overlapping each other, said inner tubular layer having an inner circumferential surface and an outer circumferential surface;

an outer layer having two opposing ends and covering said outer circumferential surface, said two longitudinal edges, and all of said inner circumferential surface of said inner tubular layer; and means for attaching said ends of said outer layer together along said inside circumferential surface of said inner layer to form a continuous sleeve thereby smoothing said longitudinal edges, said two longitudinal edges overlapping to seal said self-sealing reflective sleeve without attachment of said overlapping longitudinal edges so that said reflective sleeve can be installed and removed in situ.

10. The self-sealing reflective sleeve in accordance with claim 9, wherein said inner layer is comprised of a thermally inert, flexible material selected from the group consisting of nylon, polypropylene, polyethylene, polyamides, and polyolefin.

11. The self-sealing reflective sleeve in accordance with claim 9, wherein said inner tubular layer is corrugated.

12. The self-sealing reflective sleeve in accordance with claim 9, wherein said inner tubular layer has a thickness to diameter ratio given by a thickness in the range of 0.01 inches to 0.03 inches and an inside diameter in the range of 0.375 inches to 2.0 inches.

13. The self-sealing reflective sleeve in accordance with claim 9, wherein said inner layer has an overlap to diameter ratio given by an overlap in the range of 0.125 inches to 0.5 inches and a diameter in the range of 0.375 inches to 2 inches.

14. The self-sealing reflective sleeve in accordance with claim 9, wherein said outer layer is comprised of a material selected from the group consisting of fiberglass fabric laminated to aluminum foil and metalized polyester film.

15. The self-sealing reflective sleeve in accordance with claim 9, wherein said means for attaching said ends of said outer layer together is stitching.

16. The self-sealing reflective sleeve in accordance with claim 9, wherein said means for attaching the ends of said outer layer together is by use of pressure sensitive, cyanoacrylate, or thermoset adhesives.

17. The self-sealing reflective sleeve in accordance with claim 9, wherein said means for attaching said ends of said outer layer together is sonic welding.

* * * * *